(12) United States Patent
Chang

(10) Patent No.: US 7,563,037 B2
(45) Date of Patent: Jul. 21, 2009

(54) DIGITAL CAMERA MODULE AND LENS USED THEREIN

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 295 days.

(21) Appl. No.: 11/518,267

(22) Filed: Sep. 7, 2006

(65) Prior Publication Data
US 2007/0077057 A1   Apr. 5, 2007

(30) Foreign Application Priority Data
Sep. 30, 2005   (CN) .................... 2005 1 0100098

(51) Int. Cl.
*G03B 17/12* (2006.01)
(52) U.S. Cl. ...................... 396/351; 359/836
(58) Field of Classification Search ............... 396/351; 359/836
See application file for complete search history.

(56) References Cited
U.S. PATENT DOCUMENTS 5,448,319 A * 9/1995 Iuzawa ...................... 396/419
6,137,637 A * 10/2000 Ju et al. ....................... 359/678
2004/0246600 A1* 12/2004 Feng ........................... 359/831
2006/0017834 A1* 1/2006 Konno et al. ................ 348/335
2006/0093347 A1* 5/2006 Ishimoda et al. ............ 396/351

* cited by examiner

*Primary Examiner*—Melissa J Koval
*Assistant Examiner*—Fang-Chi Chang
(74) *Attorney, Agent, or Firm*—Steven M. Reiss

(57) ABSTRACT

A digital camera module (100) and a lens (20) used therein, the digital camera module includes a holder (10), an image pickup module (30) and a lens (20). The holder has a window (12) defined on a sidewall, the window is configured for receiving light. The image pickup module includes a base (31) and a chip (33) attached to the base, the base is mounted to the holder to cooperatively form a receiving space therebetween. The prism lens is received in the receiving space and formed from a first transmitting surface (22) configured for transmitting light passing through the window, a second reflecting surface (24) configured for reflecting light transmitted from the first surface, and a third transmitting surface (26) configured for transmitting the reflected light to form an image on the chip.

11 Claims, 2 Drawing Sheets

DIGITAL CAMERA MODULE AND LENS USED THEREIN

TECHNICAL FIELD

The present invention generally relates to digital camera modules and lenses used therein, and more particularly to a digital camera module and a lens used therein which has a minimal number optical elements and good optical performance.

BACKGROUND

With the ongoing development of micro-circuitry and multimedia technology, digital cameras are now in widespread use. High-end portable electronic devices such as mobile phones and PDAs (Personal Digital Assistants) are being developed to be increasingly multi-functional. Many of these portable electronic devices are now equipped with a digital camera. To facilitate portability, designs of such portable electronic devices tend to be compact, slim, and light. Accordingly, digital cameras incorporated in the portable electronic devices have also been required to be reduced in size and weight and also in cost.

In the digital camera equipped with generally coaxial optical systems, optical elements are arranged in the direction of the optical axis. Therefore, there is a limit to the reduction in thickness of the optical systems. At the same time, the number of lens elements unavoidably increases because it is necessary to correct chromatic aberration produced by a refracting lens used in the optical systems. Therefore, it is difficult to reduce the cost, size and weight in the present related art. In addition, since there are a number of lens elements, it is difficult to accurately coaxially assemble the lens elements of the optical system and the assembling process is relative complex as a result.

What is needed, therefore, is an improved digital camera module and a lens used therein which has a minimal number of optical elements and good optical performance.

SUMMARY

In one aspect, a digital camera module is provided. The digital camera module includes a holder, an image pickup module and a prism lens. The holder has a window defined on a sidewall, the window is configured for receiving light. The image pickup module includes a base and a chip attached to the base, the base is mounted to the holder to cooperatively form a receiving space therebetween. The prism lens is received in the receiving space and formed from a first transmitting surface configured for transmitting light passing through the window, a second reflecting surface configured for reflecting light transmitted from the first surface, and a third transmitting surface configured for transmitting the reflected light to form an image on the chip.

In another aspect, a lens used in the digital camera module is provided. The lens includes a first transmitting surface configured for transmitting light, a second reflecting surface configured for reflecting light transmitted from the first surface, and a third transmitting surface configured for transmitting the reflected light to form an image. The first surface, the second surface and the third surface are described by the following matrices equations:

$$\begin{pmatrix} X_3 \\ \alpha_{3X} \end{pmatrix} = \begin{pmatrix} 1 & 0 \\ \frac{n-n_0}{-nR_{3X}} & \frac{n}{n_0} \end{pmatrix} \begin{pmatrix} 1 & d_2 \\ 0 & 1 \end{pmatrix} \begin{pmatrix} 1 & 0 \\ \frac{-2}{R_{2X}} & 1 \end{pmatrix}$$

$$\begin{pmatrix} 1 & d_1 \\ 0 & 1 \end{pmatrix} \begin{pmatrix} 1 & 0 \\ \frac{n_0-n}{-nR_{1X}} & \frac{n}{n_0} \end{pmatrix} \begin{pmatrix} X_{IMP} \\ \alpha_{IMPX} \end{pmatrix} = \begin{pmatrix} 1 & d_3 \\ 0 & 1 \end{pmatrix} \begin{pmatrix} X_3 \\ \alpha_{3X} \end{pmatrix}$$

where, $n_0$ is the refractive index in free space;
n is the refractive index in the lens;
$X_1$ is an object height on the first surface;
$X_3$ is an object height on the second surface;
$X_{IMP}$ is an object height on an image plane of the lens;
$\alpha_{1X}$ is an incident angle between light and a line normal to the first surface;
$\alpha_{3X}$ is an incident angle between light and a line normal to the third surface;
$\alpha_{IMPX}$ is an incident angle between light and a line normal to the image plane of the lens,
$R_{1X}$ is the curvature radius of the first surface;
$R_{2X}$ is the curvature radius of the second surface;
$R_{3X}$ is the curvature radius of the third surface;
$d_1$ is the distance between an optical center of the first surface and an optical center of the second surface;
$d_2$ is the distance between the optical center of the second surface and an optical center of third surface; and
$d_3$ is the distance between the optical center of the third surface and the image plane of the lens.

Other advantages and novel features will become more apparent from the following detailed description when taken in conjunction with the accompanying drawings.

BRIEF DESCRIPTION OF THE DRAWINGS

Many aspects of the present digital camera module and lens used therein can be better understood with reference to the following drawings. The components in the drawings are not necessarily drawn to scale, the emphasis instead being placed upon clearly illustrating the principles of the digital camera module and lens used therein. Moreover, in the drawings, like reference numerals designate corresponding parts throughout the several views.

DETAILED DESCRIPTION OF THE PREFERRED EMBODIMENT

Figure 1:
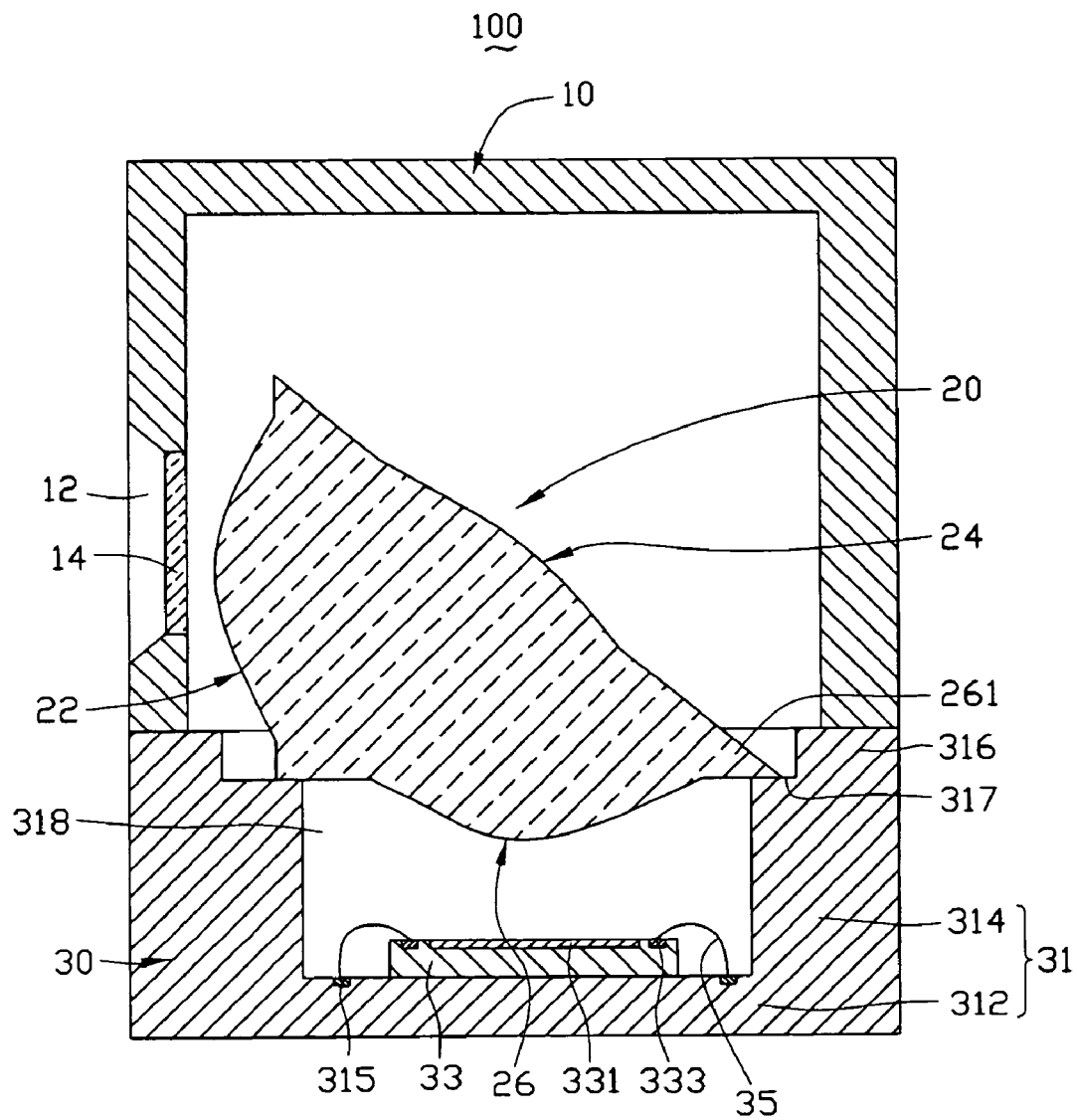
FIG. 1 is a schematic, cross-sectional view of a digital camera module according to a preferred embodiment.

Referring to FIG. 1, in a preferred embodiment, a digital camera module 100 includes a holder 10, a lens 20 and an image pickup module 30. The holder 10 receives the lens 20 therein, and is disposed on the image pickup module 30.

The holder 10 is a half-opening cylinder with a closed end and an opening end positioned opposite to the closed end. The holder 10 is made of opaque material, or material penetrable by light with a coating impenetrable by light coated thereon. The holder 10 has a window 12 disposed on a sidewall. The window 12 could be a through hole, or has a transparent board 14 embedded therein to prevent particles or dust entering into the holder 10.

The lens 20 has a triangular prism-like shape, and is formed from a first surface 22, a second surface 24 and a third surface 26. Each of the first surface 22, the second surface 24 and the third surface 26 may be an asymmetrical spherical surface or an asymmetrical aspherical surface. The first surface 22 is a first transmitting surface and is coaxial with the window 12 of the holder 10. The second surface 24 is a reflecting surface, and is configured to include a reflecting layer (not shown) with high reflective index coating thereon. The third surface 26 is a second transmitting surface. Light from an object passes through the window 12 of the holder 10 and enters the lens 20 through the first surface 22. The incident light is reflected by the second surface 24. The reflected light exits from the lens 20 through the third surface 26 and forms an image on an image plane (IMP). The third surface 26 further includes a fixing portion 261 where the periphery of the third surface 26 joins with the first surface 22 and the second surface 24. The fixing portion 261 of the third surface 26 is configured (i.e. structured and arranged) for cooperating with the image pickup module 30.

Figure 2:
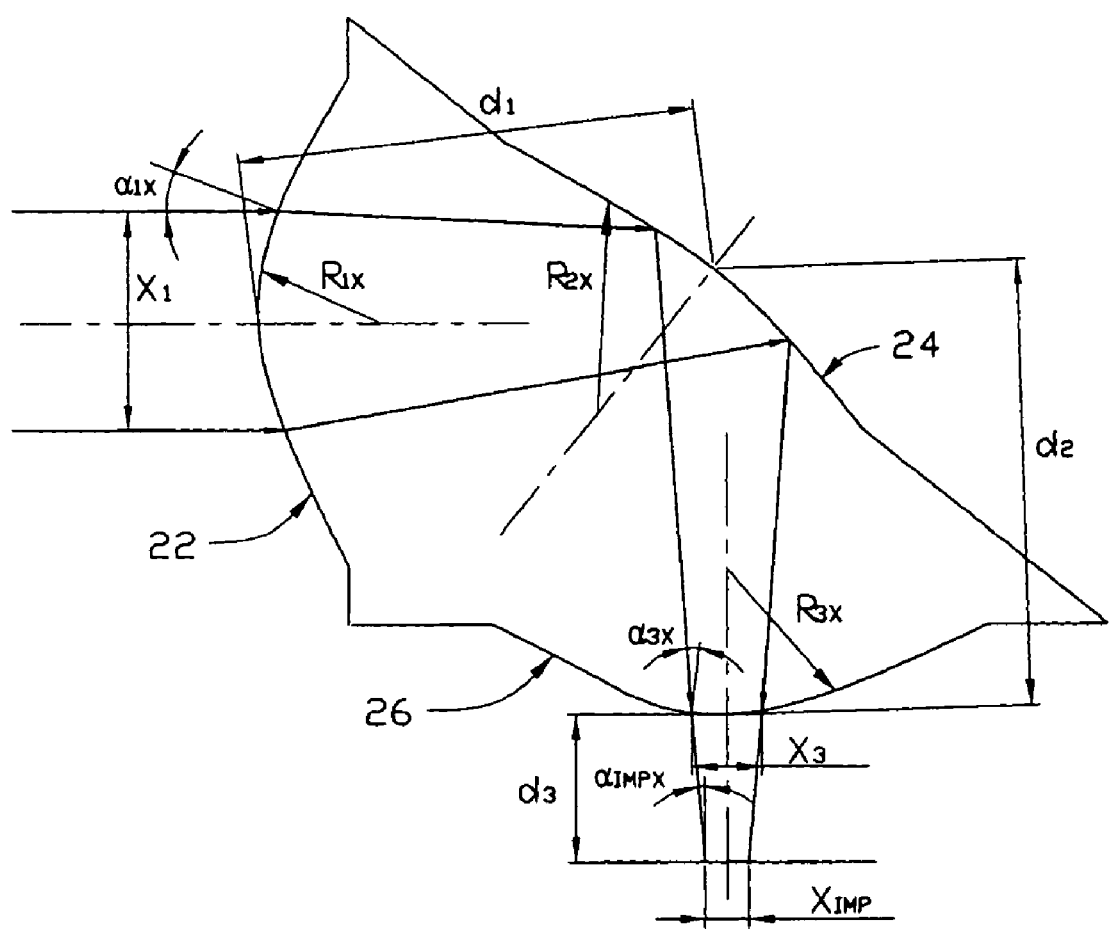
FIG. 2 is a schematic view of a lens of the digital camera module.

The lens 20 is made from optical plastic by injection molding. As regards to FIG. 2, the first surface 22, the second surface 24 and the third surface 26 of the lens 20 are described by the following matrices equations:

$$\begin{pmatrix} X_3 \\ \alpha_{3X} \end{pmatrix} = \begin{pmatrix} 1 & 0 \\ \frac{n-n_0}{-nR_{3X}} & \frac{n}{n_0} \end{pmatrix} \begin{pmatrix} 1 & d_2 \\ 0 & 1 \end{pmatrix} \begin{pmatrix} 1 & 0 \\ \frac{-2}{R_{2X}} & 1 \end{pmatrix}$$

$$\begin{pmatrix} 1 & d_1 \\ 0 & 1 \end{pmatrix} \begin{pmatrix} 1 & 0 \\ \frac{n_0-n}{-nR_{1X}} & \frac{n}{n_0} \end{pmatrix} \begin{pmatrix} X_{IMP} \\ \alpha_{IMPX} \end{pmatrix} = \begin{pmatrix} 1 & d_3 \\ 0 & 1 \end{pmatrix} \begin{pmatrix} X_3 \\ \alpha_{3X} \end{pmatrix}$$

Where:
  $n_0$, is the refractive index in free space (i.e. air);
  $n$ is the refractive index in the lens 20;
  $X_1$ is an object height on the first surface 22;
  $X_3$ is an object height on the second surface 26;
  $X_{IMP}$ is an object height on the image plane of the lens 20;
  $\alpha_{1X}$ is an incident angle between light and a line normal to the first surface 22;
  $\alpha_{3X}$ is an incident angle between light and a line normal to the third surface 26;
  $\alpha_{IMPX}$ is an incident angle between light and a line normal to the image plane of the lens 20;
  $R_{1X}$ is the curvature radius of the first surface 22;
  $R_{2X}$ is the curvature radius of the second surface 24;
  $R_{3X}$ is the curvature radius of the third surface 26;
  $d_1$, is the distance between an optical center of the first surface 22 and an optical center of the second surface 24;
  $d_2$ is the distance between the optical center of the second surface 24 and an optical center of third surface;
  $d_3$ is the distance between the optical center of the third surface 26 and the image plane of the lens 20.

The image pickup module 30 is configured (e.g. structured and arranged) to include a base 31, a chip 33 and a plurality of wires 35. The base 31 includes a board portion 312, a frame portion 314 extending upwardly from the periphery of the board portion 312, and a cavity 318 cooperatively defined by the board portion 312 and the frame portion 314. The board portion 312 is provided with a plurality of bonding pads 315 and a plurality of contacts (not shown) thereon. The bonding pads 315 are arranged on a top surface of the board portion 312, and are contained in the cavity 318. The contacts are set on a bottom surface defined opposite to the top surface of the board portion 312, and are electrically connected with the bonding pads 315 via a connecting device e.g. through holes plated with conductive materials, conductive leads and etc. (not shown). The frame portion 314 has a stepped section including a first step portion 316 and a second step portion 317. The first step portion 316 surrounds the second step portion 317, and is used to engage with the holder 10. The second step portion 317 is provided for mating with the fixing portion 261 of the lens 20. The chip 33 is generally an image sensor chip and the like (e.g. a photosensitive chip), and has an active area 331 and a plurality of metal pads 333 arranged on a top surface thereof. The active area 331 is configured for transforming light image signals into electronic image signals. The metal pads 333 are configured for transmitting image information produced by the chip 33. The chip 33 is attached to the board portion 312 of the base 31, and is receiving in the cavity 318 of the base 31. The wires 35 are made from conductive material, and electrically connect the bonding pads 315 of the base 31 and the metal pads 333 of the chip 33.

In assembly, adhesive is firstly applied on the second step portion 317 of the frame portion 314 of the image pickup module 30. Then, the lens 20 is mounted on the image pickup module 30, wherein the fixing portion 261 is adhered to the second step portion 317 and closes the cavity 318, the active area 331 of chip 33 is coaxial with the third surface 26 of the lens 20 and is disposed on the image plane of the lens 20. Next, adhesive is applied on the first step portion 316. At last, the holder 10 is adhered to the image senor module, wherein the opening end of holder 10 is adhered to the first step portion 316, the lens 20 is received in the holder 10, and the window 12 is positioned corresponding to and coaxial with the first surface 22 of the lens 20.

The digital camera module 100 is designed to be compact in size by giving a power to a reflecting second surface 24 to reduce aberration. Accordingly, the digital camera module 100 using the prism lens 20 with a reflecting surface allows the number of constituent optical elements involved in aberration correction to be reduced, making them less than an optical system using a refracting optical element. At the same time, the digital camera module 100 using the prism lens 20 with a reflecting surface allows the optical system itself to be compact in size in comparison to a refracting optical system because the optical path is folded in the digital camera module 100. In addition, the prism lens 20, in which the positional relationship between surfaces is fixed, only needs to control decentration as a single unit and does not need high assembly accuracy and a large number of man-hours for adjustment as are needed for general optical elements.

It is to be understood that, the digital camera module 100 may further includes other lenses to further improve optical performance, wherein the prism lens 20 is used as a relay lens to cooperatively form an image with other lenses.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A digital camera module, comprising:
  a holder, the holder having a window defined in a sidewall, the window configured for receiving light;
  an image pickup module, the image pickup module comprising a base and a chip attached to the base, the base being mounted to the holder, the base and the holder cooperatively forming a receiving space therebetween;

a prism lens, which is received in the receiving space and has a first surface configured for transmitting light passing through the window, a second surface configured for reflecting light transmitted from the first surface, and a third surface configured for transmitting the reflected light to form an image on the chip;

wherein the first surface, the second surface and the third surface of the prism lens are described by the following matrices equations:

$$\begin{pmatrix} X_3 \\ \alpha_{3X} \end{pmatrix} = \begin{pmatrix} 1 & 0 \\ \frac{n-n_0}{-nR_{3X}} & \frac{n}{n_0} \end{pmatrix} \begin{pmatrix} 1 & d_2 \\ 0 & 1 \end{pmatrix} \begin{pmatrix} 1 & 0 \\ \frac{-2}{R_{2X}} & 1 \end{pmatrix} \begin{pmatrix} 1 & d_1 \\ 0 & 1 \end{pmatrix}$$

$$\begin{pmatrix} 1 & 0 \\ \frac{n_0-n}{-nR_{1X}} & \frac{n}{n_0} \end{pmatrix} \begin{pmatrix} X_1 \\ \alpha_{1X} \end{pmatrix} \begin{pmatrix} X_{IMP} \\ \alpha_{IMPX} \end{pmatrix} = \begin{pmatrix} 1 & d_3 \\ 0 & 1 \end{pmatrix} \begin{pmatrix} X_3 \\ \alpha_{3X} \end{pmatrix}$$

where, $n_0$ is the refractive index in free space;
n is the refractive index in the prism lens;
$X_1$ is an object height on the first surface;
$X_3$ is an object height on the second surface;
$X_{IMP}$ is an object height on an image plane of the prism lens;
$\alpha_{1X}$ is an incident angle between light and a line normal to the first surface;
$\alpha_{3X}$ is an incident angle between light and a line normal to the third surface;
$\alpha_{IMPX}$ is an incident angle between light and a line normal to the image plane of the prism lens;
$R_{1X}$ is the curvature radius of the first surface;
$R_{2X}$ is the curvature radius of the second surface;
$R_{3X}$ is the curvature radius of the third surface;
$d_1$ is the distance between an optical center of the first surface and an optical center of the second surface;
$d_2$ is the distance between the optical center of the second surface and an optical center of third surface; and
$d_3$ is the distance between the optical center of the third surface and the image plane of the prism lens.

2. The digital camera module as claimed in claim 1, wherein the prism lens further comprises a fixing portion where the periphery of the third surface joins with the first surface and the second surface.

3. The digital camera module as claimed in claim 2, wherein the base comprises a board portion, a frame portion extending upwardly from the periphery of the board portion, and a cavity formed cooperatively by the board portion and the frame portion.

4. The digital camera module as claimed in claim 3, wherein the frame portion comprises a stepped section comprising a first step portion and a second step portion peripherally surrounded by the first step portion, and the fixing portion of the prism lens is attached to the second step portion of the base, and the holder is mounted to the first step portion of the base.

5. The digital camera module as claimed in claim 3, wherein the chip is mounted to the board potion and received in the cavity.

6. The digital camera module as claimed in claim 5, wherein the chip is provided with a plurality of metal pads thereon, thereby transmitting image information produced by the chip.

7. The digital camera module as claimed in claim 6 wherein the base is provided with a plurality of bonding pads on a top surface of the board portion, and the bonding pads are contained in the cavity.

8. The digital camera module as claimed in claim 7, wherein the image pickup module further comprises a plurality of wires, and the wires electrically connect the metal pads of the chip to the bonding pads of the base.

9. The digital camera module as claimed in claim 1, wherein the chip of the image pickup module is on en image plane of the prism lens.

10. The digital camera module as claimed in claim 1, wherein the prism lens is made from optical plastic by injection molding.

11. A lens used in a digital camera module, comprising:
a first surface configured for transmitting light;
a second surface configured for reflecting light transmitted from the first surface; and
a third surface configured for transmitting the reflected light to form an image;
wherein the first surface, the second surface and the third surface are described by the following matrices equations:

$$\begin{pmatrix} X_3 \\ \alpha_{3X} \end{pmatrix} = \begin{pmatrix} 1 & 0 \\ \frac{n-n_0}{-nR_{3X}} & \frac{n}{n_0} \end{pmatrix} \begin{pmatrix} 1 & d_2 \\ 0 & 1 \end{pmatrix} \begin{pmatrix} 1 & 0 \\ \frac{-2}{R_{2X}} & 1 \end{pmatrix} \begin{pmatrix} 1 & d_1 \\ 0 & 1 \end{pmatrix}$$

$$\begin{pmatrix} 1 & 0 \\ \frac{n_0-n}{-nR_{1X}} & \frac{n}{n_0} \end{pmatrix} \begin{pmatrix} X_1 \\ \alpha_{1X} \end{pmatrix} \begin{pmatrix} X_{IMP} \\ \alpha_{IMPX} \end{pmatrix} = \begin{pmatrix} 1 & d_3 \\ 0 & 1 \end{pmatrix} \begin{pmatrix} X_3 \\ \alpha_{3X} \end{pmatrix}$$

where, $n_0$ is the refractive index in free space;
n is the refractive index in the prism lens;
$X_1$ is an object height on the first surface;
$X_3$ is an object height on the second surface;
$X_{IMP}$ is an object height on an image plane of the lens;
$\alpha_{1X}$ is an incident angle between light and a line normal to the first surface;
$\alpha_{3X}$ is an incident angle between light and a line normal to the third surface;
$\alpha_{IMPX}$ is an incident angle between light and a line normal to the image plane of the lens;
$R_{1X}$ is the curvature radius of the first surface;
$R_{2X}$ is the curvature radius of the second surface;
$R_{3X}$ is the curvature radius of the third surface;
$d_1$ is the distance between an optical center of the first surface and an optical center of the second surface;
$d_2$ is the distance between the optical center of the second surface and an optical center of third surface; and
$d_3$ is the distance between the optical center of the third surface and the image plane of the lens.

* * * * *